Patented July 20, 1948

2,445,576

UNITED STATES PATENT OFFICE 2,445,576

METHOD FOR PREPARING ORTHOSILICATES

Charles P. Haber, Schenectady, N. Y., assignor to General Electric Company, a corporation of New York No Drawing. Application June 19, 1946, Serial No. 677,915

9 Claims. (Cl. 260—448.8)

This invention relates to a method for preparing silicic acid esters of organo-hydroxy compounds and more particularly to a method of preparing aliphatic esters of ortho-silicic acid by reacting aliphatic alcohols with magnesium silicide.

Organo-hydroxy compounds which may be employed are saturated aliphatic monohydroxy alcohols such as, for example, methanol, ethanol, propanol, isopropanol, and other normal and branched-chain alcohols of the homologous series including higher molecular weight alcohols such as, for example, octadecanol; unsaturated aliphatic alcohols such as, for example, allyl alcohol, methallyl alcohol, and crotyl alcohol; and aliphatic polyhydroxy alcohols such as, for example, ethylene glycol.

Heretofore esters of silicic acid have been prepared by reacting alcohols with silicon tetrachloride. For example, ethyl silicate has ordinarily been prepared by reacting ethyl alcohol with silicon tetrachloride, hydrochloric acid being a by-product. The handling and disposal of the large quantities of hydrochloric acid resulting from this method constitute a difficult problem due to its corrosive nature. In addition, silicon tetrachloride is normally quite expensive.

By the method of my invention aliphatic esters of silicic acid can be obtained by the reaction of magnesium silicide with aliphatic alcohols at a relatively low cost and without any corrosive by-products. Magnesium silicide ($Mg_2Si$) is known to react with water to give silane ($SiH_4$) and magnesium hydroxide. However, it has been found, surprisingly, that a different type of reaction occurs when magnesium silicide is reacted with alcohols. Instead of silane being formed in the reaction, the products of the reaction are the orthosilicic acid ester of the alcohol, the magnesium salt of the alcohol, and free hydrogen. Although the reaction probably takes place in a step-wise fashion, the over-all results can best be illustrated by the following equation showing the reaction of methyl alcohol with magnesium silicide:

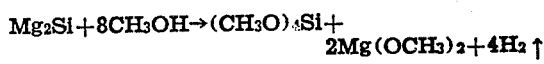
$$Mg_2Si + 8CH_3OH \rightarrow (CH_3O)_4Si + 2Mg(OCH_3)_2 + 4H_2 \uparrow$$

An advantage of the method of this invention over the method heretofore employed in the production of ortho-silicic acid esters is apparent from an observation of the products of the reaction illustrated by the above equation. Rather than the corrosive by-product, hydrochloric acid, necessarily produced by the method heretofore employed, the magnesium salt of the alcohol and free hydrogen, both commercially valuable by-products, are produced.

In general, according to this invention, magnesium silicide is added slowly to the alcohol, the mixture is refluxed until the reaction is complete, and the gas evolved is passed through a wet gas meter. It is generally necessary to heat the reaction mixture. However, in employing certain alcohols such as methanol, sufficient heat is evolved during the reaction to make unnecessary the application of additional heat.

It is desirable to carry out the reaction with an excess of alcohol in order to accelerate the reaction in the desired direction and, furthermore, to afford a medium for the reaction. Thus, when a monohydroxy alcohol is employed, an excess over the stoichiometric 8 mols of the alcohol per mol of magnesium silicide is desirable. However, instead of employing a large excess of the alcohol as a medium in which to carry out the reaction, an inert solvent and only a slight excess of the alcohol may be used. These inert solvents do not react with the magnesium silicide, the alcohol, or any of the products of the reaction. Examples of such solvents are hydrocarbons such as benzene, toluene, and petroleum ethers, and ethers such as diethyl, dibutyl, etc.

The point at which the reaction is complete can be determined by measuring the amount of hydrogen evolved. For example, when one mol of magnesium silicide is employed with an excess of alcohol the reaction is complete when four mols of hydrogen have been evolved.

It has been found that the reaction between magnesium silicide and the various alcohols is carried out to best advantage under anhydrous conditions. However, commercial grades of the alcohols containing small amounts of water such, as for example, 95 per cent ethyl alcohol, may be employed if the reaction is started with a small amount of a highly reactive anhydrous alcohol. Anhydrous methyl alcohol is particularly useful as a highly reactive starting alcohol. When such commercial grades of alcohol are employed, smaller yields of the desired silicic acid ester are obtained, which may be attributed to the formation of appreciable quantities of by-products such as disiloxane and polysiloxane esters.

In addition to using small quantities of anhydrous alcohols to start the main reaction where alcohols containing small quantities of water are employed in this reaction, these starting alcohols may also be employed in initiating reactions of magnesium silicide with alcohols that are normally reluctant to react. It has been found sufficient merely to moisten the magnesium silicide with anhydrous methyl alcohol, and allow the methyl alcohol to react completely, thereby forming magnesium methylate and magnesium silicate. The other alcohol, the aliphatic silicate of which is desired as a product, is then added as soon as the initiating reaction stops. The reaction mixture is then heated sufficiently to cause refluxing until the main reaction is completed. Thus, if it is desired to react magnesium silicide with propyl alcohol, the reaction may be started rapidly by first moistening the magnesium silicide in the reaction vessel with anhydrous methanol, and allowing the methanol to react completely. The reaction vessel may be warmed if necessary. After the methanol has completely reacted, the necessary quantity of propyl alcohol is added and the mixture is refluxed until the reaction is complete. The propyl silicate is then separated from the reaction mass, e. g. by distillation.

The reason for the effectiveness of the method in which the reaction is initiated by reacting the magnesium silicide with a small quantity of anhydrous methanol is two-fold. First, the magnesium methylate formed in the preliminary reaction acts as a dehydrating agent on the other alcohol with the formation of magnesium hydroxide and methyl alcohol, and secondly, during the reaction with the anhydrous alcohol the magnesium silicide is cleansed of its oxide surface and thereby activated.

In order that those skilled in the art better may understand how the present invention may be practiced, the following examples are given by way of illustration:

*Example 1*

One hundred and thirty grams of magnesium silicide was added slowly over a two-hour period to 1500 cc. of anhydrous methanol in a 3-liter flask equipped with a reflux condenser, and the gas evolved was passed through a trap cooled by liquid air and measured by a wet gas meter. Considerable heat was evolved during the reaction, and it was necessary to cool the flask with ice. 5.7 cubic feet of hydrogen was evolved during the reaction which corresponds to a ratio of 4 mols of hydrogen per mol of magnesium silicide added to the reaction mixture. After the reaction was complete, 110 grams of methyl silicate was distilled from the reaction mass.

*Example 2*

Thirty-five grams of a total of 100 grams of magnesium silicide was added to 500 cc. of absolute ethanol and the mixture was brought to reflux. After refluxing for an hour the reaction started, and a liter of 95 percent ethanol and the rest of the magnesium silicide were added over a period of two hours. This reaction did not evolve as much heat as did the reaction of magnesium silicide with methanol and no cooling was necessary. The amount of hydrogen collected corresponded quantitatively to the ratio of four mols of hydrogen to one mol of magnesium silicide. The magnesium ethylate which precipitated as an amorphous solid was removed from the reaction mass by filtration, and the ethyl silicate was separated by distillation.

Employing methods similar to those set forth in the above examples, silicic acid esters of propyl, isopropyl, allyl, octadecyl, and ethylene glycol were also prepared.

Other types of organo hydroxy compounds such as aromatic alcohols and phenols will react with magnesium silicide in the manner set forth above. For example, benzyl alcohol and guaiacol will react with magnesium silicide to form the corresponding silicic acid ester.

The products of this invention have utility in the preparation of other products, e. g., in the manufacture of alkyl methoxy silanes such as methyl or ethyl methoxy silanes. They may also be used as preservatives for stone, as a source of pure silica for phosphorescent powders, as delusterants, etc. In addition, tetramethyl silicate is useful as an ingredient for increasing the wet strength of paper.

What I claim as new and desire to secure by Letters Patent of the United States is:

1. The method of preparing aliphatic esters of silicic acid which comprises refluxing aliphatic alcohols with magnesium silicide under anhydrous conditions.

2. The method of preparing an aliphatic ester of silicic acid which comprises refluxing under anhydrous conditions a mixture containing an aliphatic alcohol and magnesium silicide until reaction is complete, and separating said ester from the reaction mass.

3. The method of preparing an aliphatic ester of silicic acid which comprises refluxing under anhydrous conditions a monohydroxy aliphatic alcohol with magnesium silicide in the ratio of at least 8 mols of alcohol to 1 mol of magnesium silicide.

4. The method of preparing an aliphatic ester of silicic acid which comprises refluxing under anhydrous conditions a mixture containing an aliphatic alcohol, an inert solvent for said alcohol, and magnesium silicide, and separating said ester from the reaction mass.

5. The method of preparing methyl silicate which comprises refluxing methyl alcohol with magnesium silicide under anhydrous conditions.

6. The method of preparing methyl silicate which comprises refluxing under anhydrous conditions a mixture containing methyl alcohol and magnesium silicide, and separating methyl silicate from the reaction mass.

7. The method of preparing ethyl silicate which comprises refluxing ethyl alcohol with magnesium silicide under anhydrous conditions.

8. The method of preparing ethyl silicate which comprises refluxing under anhydrous conditions a mixture containing ethyl alcohol and magnesium silicide in the ratio of at least 8 mols of alcohol to 1 mol of magnesium silicide, and separating ethyl silicate from the reaction mass.

9. The method of preparing aliphatic esters of silicic acid which comprises the steps of adding a small quantity of highly reactive anhydrous aliphatic alcohol to magnesium silicide, reacting said alcohol with the magnesium silicide, adding another aliphatic alcohol in excess of the quantity necessary to completely react with the magnesium silicide, refluxing the mixture until the reaction is complete, and separating the resulting aliphatic ester of silicic acid from the reaction mass.

CHARLES P. HABER.

REFERENCES CITED

The following references are of record in the file of this patent:

Besson, Chemical Abstracts, vol. 6, page 1109 (1912).

Hock et al., Chemical Abstracts, vol. 10, page 1141 (1916).

Schevarz et al., Berichte der Deu Chem., vol. 55B, page 3244 (1922).